(12) United States Patent
Zhou et al.

(10) Patent No.: US 12,250,052 B2
(45) Date of Patent: Mar. 11, 2025

(54) USER EQUIPMENT REQUESTED RADIO LINK ADAPTATION OPERATIONS

(71) Applicant: QUALCOMM Incorporated, San Diego, CA (US)

(72) Inventors: Yan Zhou, San Diego, CA (US); Konstantinos Dimou, New York, NY (US); Tao Luo, San Diego, CA (US); Raghu Narayan Challa, San Diego, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/999,611

(22) PCT Filed: Jul. 6, 2021

(86) PCT No.: PCT/US2021/040510
§ 371 (c)(1),
(2) Date: Nov. 22, 2022

(87) PCT Pub. No.: WO2022/010896
PCT Pub. Date: Jan. 13, 2022

(65) Prior Publication Data
US 2023/0198597 A1 Jun. 22, 2023

(30) Foreign Application Priority Data
Jul. 10, 2020 (GR) ............................... 20200100404

(51) Int. Cl.
*H04B 7/06* (2006.01)
*H04B 7/08* (2006.01)
(Continued)

(52) U.S. Cl.
CPC .......... *H04B 7/0695* (2013.01); *H04B 7/088* (2013.01); *H04L 1/0026* (2013.01); *H04W 36/06* (2013.01); *H04W 36/26* (2013.01)

(58) Field of Classification Search
CPC ..... H04B 7/0695; H04B 7/088; H04L 1/0026; H04L 1/0001; H04W 36/06; H04W 36/26
See application file for complete search history.

(56) References Cited

U.S. PATENT DOCUMENTS

2019/0141693 A1 5/2019 Guo et al.
2019/0306924 A1* 10/2019 Zhang .................... H04B 7/063
(Continued)

FOREIGN PATENT DOCUMENTS

CA 2844372 A1 * 2/2013 .......... H04B 7/0408
CN 103875191 A 6/2014
(Continued)

OTHER PUBLICATIONS

Machine translation of KR-20190072507-A. (Year: 2019).*
(Continued)

*Primary Examiner* — Jean B Corrielus
(74) *Attorney, Agent, or Firm* — Harrity & Harrity, LLP

(57) ABSTRACT

Various aspects of the present disclosure generally relate to wireless communication. In some aspects, a user equipment (UE) may detect a change of one or more reception conditions. The UE may transmit, to a base station and based at least in part on the change of the one or more reception conditions, a request for a radio link adaptation operation to update one or more of a reception beam or a transmission beam of the base station used to communicate with the UE. Numerous other aspects are described.

27 Claims, 6 Drawing Sheets

(51) Int. Cl.
*H04L 1/00* (2006.01)
*H04W 36/06* (2009.01)
*H04W 36/26* (2009.01)

(56) References Cited

U.S. PATENT DOCUMENTS

2020/0092739 A1  3/2020  Yang et al.
2020/0145085 A1  5/2020  John Wilson et al.
2021/0320749 A1*  10/2021  Liu ..................... H04L 1/0023

FOREIGN PATENT DOCUMENTS

EP         3579465 A1    12/2019
WO         2020102975     5/2020
WO     WO-2020259832 A1 *  12/2020

OTHER PUBLICATIONS

Machine translation of CN-104429117-A. (Year: 2015).*
International Search Report and Written Opinion—PCT/US2021/040510—ISA/EPO—Oct. 7, 2021.

Mediatek Inc: "CAPC for RACH and PUCCH in NR-U", 3GPP TSG-RAN WG2 Meeting #106, 3GPP Draft, Tdoc R2-1905672_CAPC for RACH and PUCCH in NR-U, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, 4 Pages, May 2, 2019 (May 2, 2019), XP051710027, the whole document.
QUALCOMM: "Beam Management for NR", 3GPP Draft, 3GPP TSG-RAN WG1 #90bis, R1-1718541, 3rd Generation Partnership Project (3GPP), Mobile Competence Centre, 650, Route Des Lucioles, F-06921 Sophia-Antipolis Cedex, France, vol. RAN WG1, No. Prague. P.R. Czechia, Oct. 9, 2017-Oct. 13, 2017, Oct. 8, 2017 (Oct. 8, 2017), XP051341723, 17 Pages, fig. 1+par. 3.1.1, 4., 6.,9, fig 0-1, Section 2.1, Section 2.2, Section 3, the whole document.
SONY: "PUSCH Configurations for MsgA of 2-Step RACH", 3GPP TSG-RAN WG2 Meeting #107, 3GPP Draft, R2-1909906 PUSCH CONFIGURATIONS_V1A, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, 3 Pages, Aug. 15, 2019 (Aug. 15, 2019), XP051767697, the whole document.

* cited by examiner

USER EQUIPMENT REQUESTED RADIO LINK ADAPTATION OPERATIONS

CROSS-REFERENCE TO RELATED APPLICATION APPLICATIONS

This Patent Application is a 371 national stage of PCT Application PCT/US2021/040510, filed on Jul. 6, 2021, entitled "USER EQUIPMENT REQUESTED RADIO LINK ADAPTATION OPERATIONS," which claims priority to Greek patent application Ser. No. 20/200,100404, filed on Jul. 10, 2020, entitled "USER EQUIPMENT REQUESTED RADIO LINK ADAPTATION OPERATIONS," which are hereby expressly incorporated by reference herein.

FIELD OF THE DISCLOSURE

Aspects of the present disclosure generally relate to wireless communication and to techniques and apparatuses for user equipment requested radio link adaptation operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: detecting a change of one or more reception conditions; and transmitting, to a base station and based at least in part on the change of the one or more reception conditions, a request for a radio link adaptation operation to update one or more of a reception beam or a transmission beam of the base station used to communicate with the UE.

In some aspects, a UE for wireless communication includes: a memory; and one or more processors coupled to the memory, the one or more processors configured to: detect a change of one or more reception conditions; and transmit, to a base station and based at least in part on the change of the one or more reception conditions, a request for a radio link adaptation operation to update one or more of a reception beam or a transmission beam of the base station used to communicate with the UE.

In some aspects, a non-transitory computer-readable medium storing one or more instructions for wireless communication includes: one or more instructions that, when executed by one or more processors of a user equipment, cause the one or more processors to: detect a change of one or more reception conditions; and transmit, to a base station and based at least in part on the change of the one or more reception conditions, a request for a radio link adaptation operation to update one or more of a reception beam or a transmission beam of the base station used to communicate with the UE.

In some aspects, an apparatus for wireless communication includes: means for detecting a change of one or more reception conditions; and means for transmitting, to a base station and based at least in part on the change of the one or more reception conditions, a request for a radio link adaptation operation to update one or more of a reception beam or a transmission beam of the base station used to communicate with the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
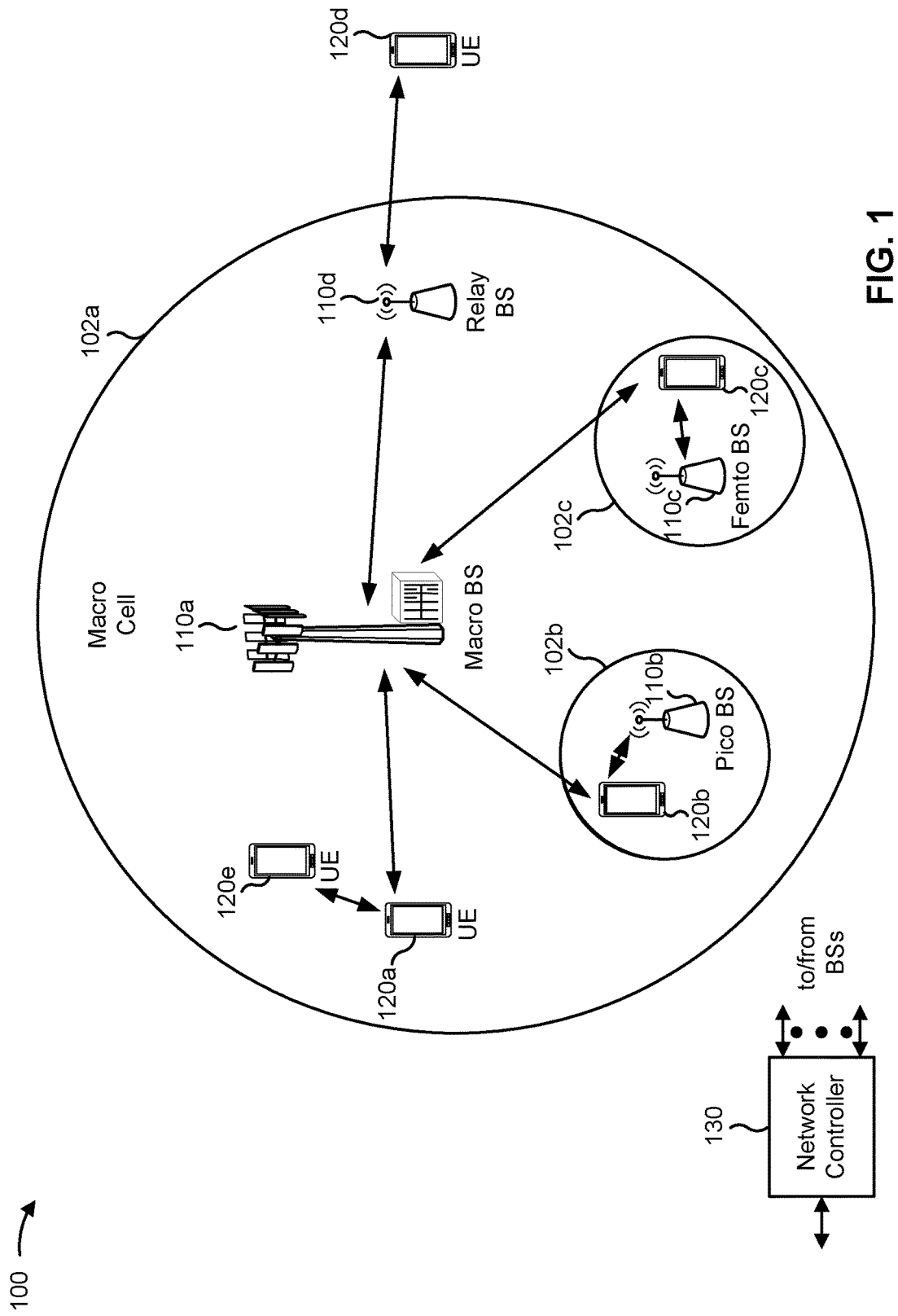
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
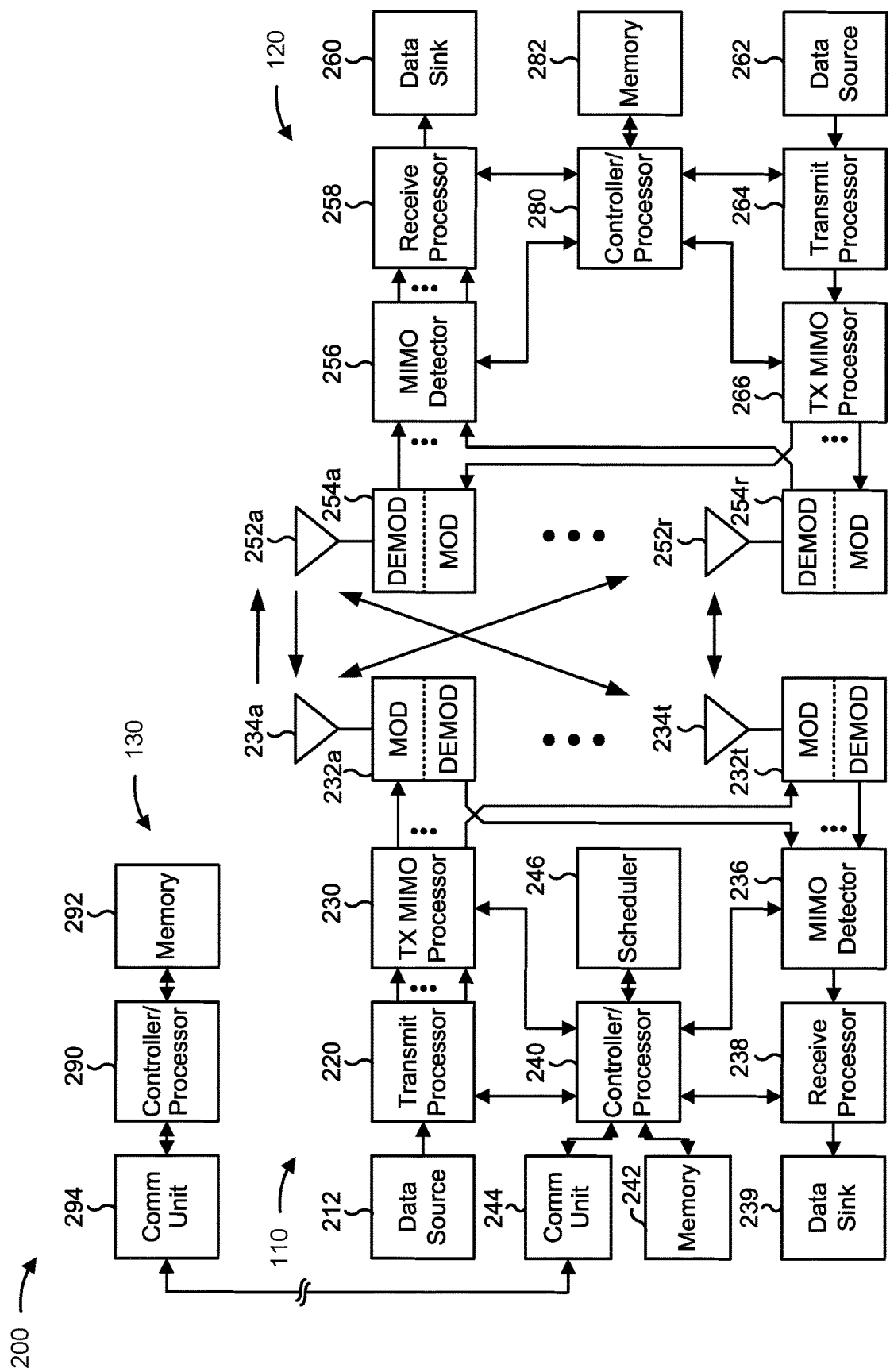
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6.

Controller/processor 240 of base station 110, controller/processor 280 of UE 120, and/or any other component(s) of FIG. 2 may perform one or more techniques associated with UE requested radio link adaptation operations, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, UE 120 may include means for detecting a change of one or more reception conditions; means for transmitting, to a base station and based at least in part on the change of the one or more reception conditions, a request for a radio link adaptation operation to update one or more of a reception beam or a transmission beam of the base station used for one or more communications with the UE; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
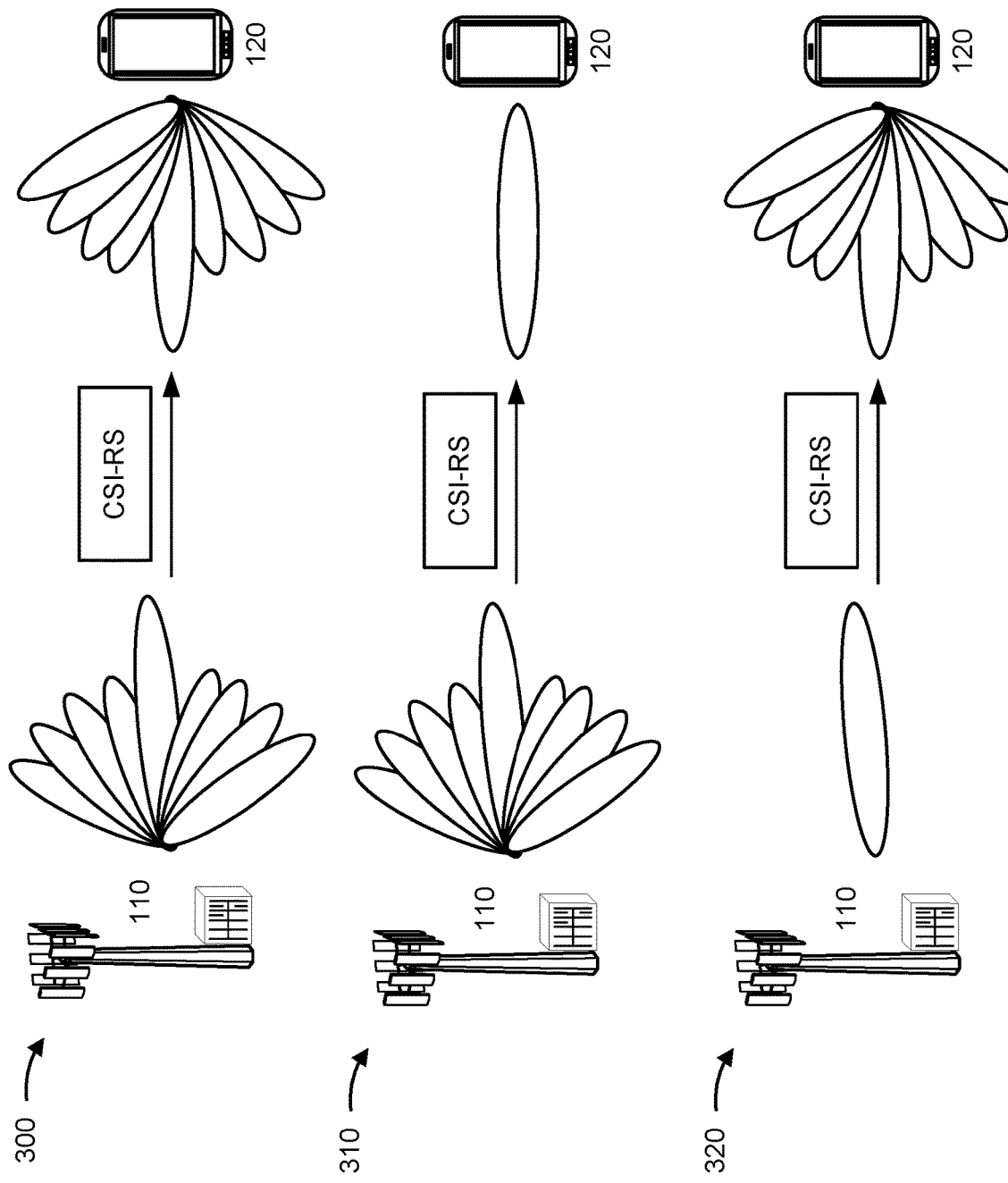
FIG. 3 is a diagram illustrating examples of channel state information reference signal beam management procedures, in accordance with the present disclosure.

FIG. 3 is a diagram illustrating examples 300, 310, and 320 of channel state information (CSI) reference signal (CSI-RS) beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, each CSI-RS on a transmit beam can be transmitted repeatedly multiple times in the same RS resource set so that the UE 120 can sweep through receive beams in multiple transmission instants. For example, if the base station 110 has a set of N transmit beams and the UE 120 has a set of M receive beams, the CSI-RS may be transmitted on each of the N transmit beams M times so that the UE 120 may receive M beams per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the in connection with the first beam management procedure). The second beam management procedure may enable the base station 110 to select a best transmit beam based at least in part on reported measurements received from the UE 120 (e.g., using the single receive beam).

As shown in FIG. 3, example 320 may depict a third beam management procedure (e.g., P3 CSI-RS beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs on a single transmit beam (e.g., determined based at least in part on measurements reported by the UE 120 in connection with the first beam management procedure and/or the second beam management procedure). To enable the UE 120 to perform receive beam sweeping, the CSI-RS on the transmit beam can be transmitted repeatedly multiple times in the same RS resource set so that UE 120 can sweep through one or more receive beams in multiple transmission instants. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS on the transmit beam using the one or more receive beams).

As indicated above, FIG. 3 is provided as an example. Other examples may differ from what is described with respect to FIG. 3.

Once a base station and a UE have selected beams for one or more beam pairs, the base station may be aware of one or more UE beams used by the UE. However, the UE may autonomously switch a receive beam (e.g., a UE beam of a beam pair) based at least in part on changed reception conditions. If the UE autonomously switches a receive beam (e.g., based at least in part on mobility of the UE, rotation of the UE, and/or the like), the base station may be unaware that the UE has switched receive beams until a subsequent channel state feedback (CSF) report and/or a subsequent beam report. Based at least in part on the base station being unaware that the UE has switched receive beams, the base station may use outdated CSI, which may degrade performance of a communication link between the base station and the UE. For example, based at least in part on the base station using outdated CSI, the UE may receive downlink communications with an increased error rate, with suboptimal spectral efficiency, and/or the like, which may consume communication and network resources.

In some aspects described herein, a UE may determine a change of one or more reception conditions and may transmit (e.g., autonomously) a request for a radio link adaptation operation to update a reception beam and/or a transmission beam of a base station used for communications with the UE. In some aspects, a change of one or more reception conditions may include, or may be based at least in part on, the UE changing a UE transmission beam and/or a UE reception beam, a link quality change (e.g., a change in RSRP, signal to interference plus noise ratio (SINR), pathloss, and/or the like), movement of the UE, a speed change of the UE, an orientation change of the UE, detected reflector and/or scatter changes (e.g., angle and/or strength changes of received signals), and/or the like.

In some aspects, the UE may transmit the request for the radio link adaptation operation via one or more MAC CEs and/or via uplink control information (UCI). In some aspects, the UE may use an existing grant to transmit the request for the radio link adaptation operation, request a new grant to transmit the request for the radio link adaptation operation, and/or transmit with other UCI (e.g., hybrid automatic repeat request (HARQ) feedback).

Based at least in part on receiving the request for the radio link adaptation operation, the base station may schedule the UE to receive one or more reference signals and/or report measurements and/or metrics associated with the one or more reference signals. This may facilitate beam synchronization between the base station and UE and may allow the base station to receive current CSI to determine downlink transmission parameters. Based at least in part on the base station receiving current CSI to determine downlink transmission parameters, the base station may determine proper transmission parameters (e.g., an MCS, a transport block size, a resource allocation, a transmit power, a beam direction, and/or the like) for downlink communications, which may conserve communication, network, and/or power resources associated with the UE and/or the base station.

Figure 4:
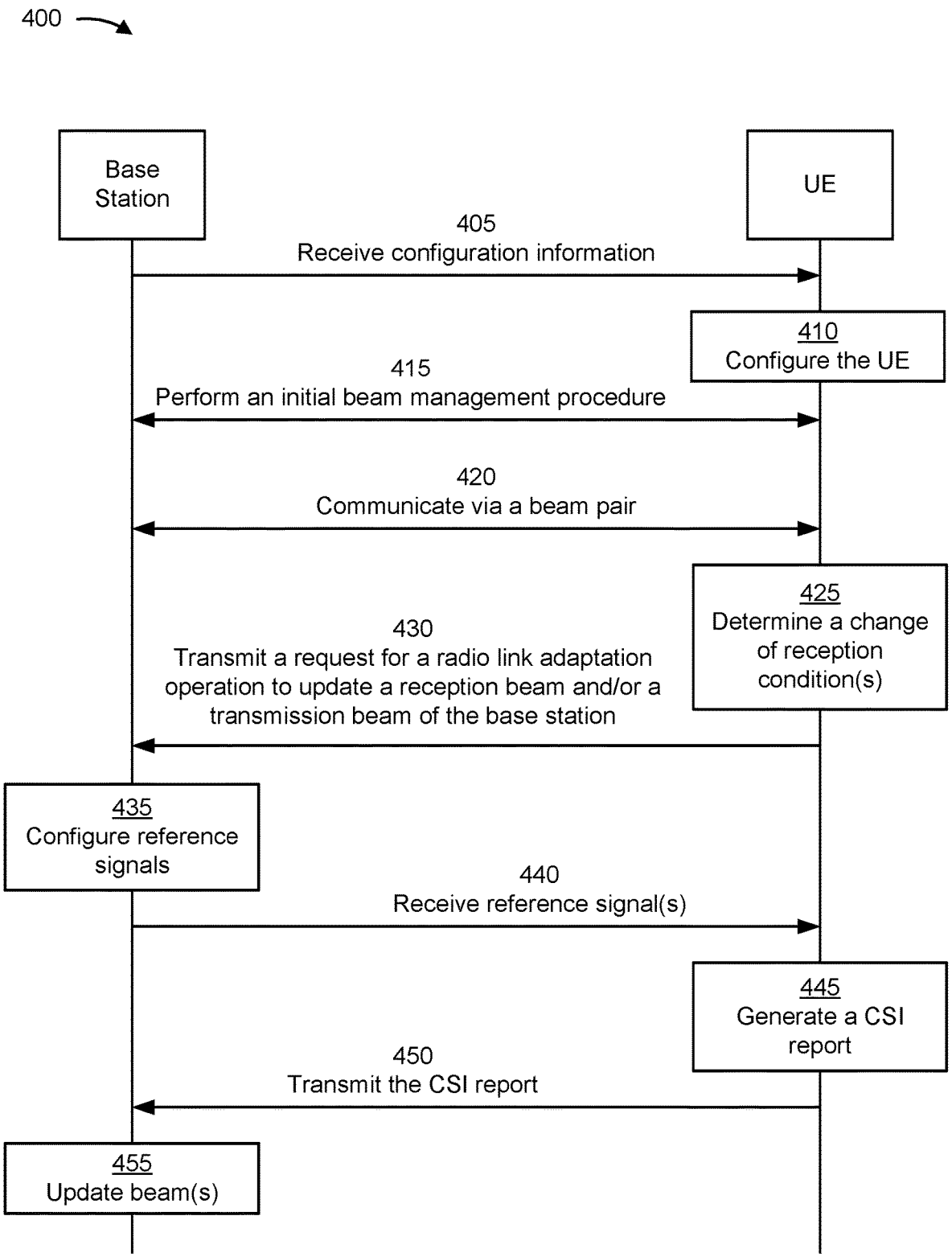
FIGS. 4 and 5 are diagrams illustrating examples associated with UE requested radio link adaptation operations, in accordance with the present disclosure.

FIG. 4 is a diagram illustrating an example 400 associated with UE requested radio link adaptation operations, in accordance with the present disclosure. As shown in FIG. 4, a base station (e.g., base station 110) may communicate with a UE (e.g., UE 120). The base station and the UE may be part of a wireless network (e.g., wireless network 100). In some aspects, the UE and the base station may be configured to communicate using millimeter wave signals, beamforming, and/or the like.

As shown by reference number 405, the base station may transmit, and the UE may receive, configuration information. In some aspects, the UE may receive the configuration information from another device (e.g., from another base station, another UE, and/or the like), from a specification of a communication standard, and/or the like. In some aspects, the UE may receive the configuration information via one or more of RRC signaling, MAC signaling (e.g., MAC CEs), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to perform one or more beam management procedures, such as a beam selection procedure, to select one or more beams for communicating with the base station. In some aspects, the configuration information may indicate that the UE is to perform one or more beam management procedures, such as a beam refinement procedure, to update one or more parameters of a UE beam and/or a base station beam, such as a beam direction, transmit parameters, and/or the like. In some aspects, the configuration information may indicate that the UE is permitted to autonomously update one or more parameters of a UE reception beam.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE and the base station may perform an initial beam management procedure. For example, the UE may perform a beam selection procedure, a base station beam refinement procedure, a UE beam refinement procedure, and/or the like. Based at least in part on the initial beam management procedure, the UE and the base station may select a beam pair for communicating. In some aspects, the UE and the base station may select the beam pair based at least in part on conditions at a time of selection or prior to the time of selection. For example, the UE and the base station may select the beam pair based at least in part on CSI that is measured and/or reported at the time of selection or prior to the time of selection.

As shown by reference number 420, the UE and the base station may communicate via the beam pair. For example, the base station may communicate with the UE (e.g., transmit communications to the UE, receive communications from the UE) using a base station beam of the beam pair and the UE may communicate with the base station (e.g., transmit communications to the base station, receive communications from the base station) using a UE beam of the beam pair.

As shown by reference number 425, the UE may determine a change of one or more reception conditions. For example, the UE may determine that the one or more reception conditions have changed based at least in part on mobility, rotation, and/or the like of the UE.

In some aspects, the change of the one or more reception conditions may include an update of the UE beam (e.g., a UE reception beam and/or a UE transmission beam) that may correspond to the base station beam (e.g., a base station reception beam and/or a base station transmission beam), a quasi-co-location (QCL) indication, a transmission configuration indicator (TCI) state, a spatial relation, and/or the like. In other words, the UE may update one or more parameters of the UE beam, may update to a new UE beam, and/or the like. In some aspects, the UE may select the new UE beam based at least in part on measuring a physical downlink control channel (PDCCH), a physical downlink shared channel (PDSCH), one or more reference signals, and/or the like using one or more candidate beams (e.g., using one or more panels of the UE). For example, the UE may measure one or more DMRSs of the PDCCH, PDSCH, and/or the like. In some aspects, the UE may measure one or more CSI-RSs that are transmitted (e.g., by the base station) using repetition and without a CSI report occasion for a threshold amount of time.

In some aspects, the UE may update the UE beam to the new UE beam based at least in part on mobility of the UE (e.g., a change of geolocation that satisfies a movement threshold), rotation of the UE (e.g., rotation that satisfies an angle threshold), an object moving into a path of the UE beam (e.g., causing reflection, refraction, a maximum permissible exposure event, and/or the like), and/or the like.

In some aspects, the change of the one or more reception conditions may include a change of an RSRP that satisfies a link quality change threshold (e.g., a threshold change in dBs), a change of an SINR that satisfies the link quality change threshold, or a change of a pathloss that satisfies the link quality change threshold. In some aspects, the change of the one or more reception conditions may include a change in speed of the UE that satisfies an acceleration threshold (e.g., a non-zero acceleration), a reflector change that satisfies a reflector change threshold, a scatter change that satisfies a scatter change threshold, and/or the like.

In some aspects, the UE may determine one or more of the described thresholds based at least in part on configuration information (e.g., from a communication standard, RRC signaling from the base station, and/or the like), dynamic signaling (e.g., an indication within a resource grant, one or more MAC CEs, a downlink control information message, and/or the like), and/or the like.

In some aspects, the request for the radio link adaptation operation may indicate a request for reference signals to measure and/or report CSI-related metrics, corresponding beam identifications, and/or reference signal identifications. In some aspects, the request for the radio link adaptation operation may indicate a request for a beam refinement process via CSI-RSs using repetitions (e.g., with repetition set to ON). In some aspects, the UE may indicate (e.g., within the request for the radio link adaptation operation, within the request for the beam refinement process via CSI-RSs using repetitions, and/or the like) a recommended repetition number for the CSI-RSs using repetitions. In some aspects, the UE may request repetitions in time, frequency, and/or space for CSI-RS and/or for data channels transmitted during a transition operation mode. The transition operation mode may apply to a period between the UE transmitting the request and the base station updating one or more base station beams.

As shown by reference number 430, the UE may transmit a request for a radio link adaptation operation to update a reception beam and/or a transmission beam of the base station. In some aspects, the determining the change of the one or more conditions may trigger the UE to transmit the request.

In some aspects, the UE may transmit the request via one or more MAC CEs. In some aspects, the UE may transmit the one or more MAC CEs using an uplink grant (e.g., a physical uplink share channel (PUSCH) grant) received before generation of the request. In some aspects, the UE may transmit a scheduling request (e.g., based at least in part on generating the request) for a new grant through which the UE may transmit the one or more MAC CEs.

In some aspects, the UE may request a new grant via one or more new UCI bits transmitted with another type of UCI. In some aspects, the other type of UCI may include HARQ feedback. In some aspects, the UE may activate a predetermined grant via one or more new UCI bits (e.g., transmitted with HARQ feedback). For example, the UE may activate, using the one or more new UCI bits, a predetermined PUSCH resource that is a predetermined number of slots after a physical uplink control channel (PUCCH) that carries the one or more new UCI bits.

In some aspects, the UE may transmit the request via UCI. In some aspects, the UE may transmit the UCI via a PUCCH, a PUSCH, and/or the like. In some aspects, the UE may multiplex the UCI with another type of UCI (e.g., HARQ feedback, such as a soft acknowledgement/negative acknowledgement (ACK/NACK)). In some aspects, the UE may transmit the request in a single uplink transmission. In some aspects, the UE may multiplex the UCI onto a periodic CSI report. In some aspects, the UCI may activate a resource for a special CSI report.

In some aspects, the UE may transmit the request via 2-stage UCI (e.g., using two uplink transmissions). The UE may transmit a first stage UCI that carries a first portion of the request that includes a resource request for transmitting a second stage UCI. In some aspects, the first stage UCI (e.g., appended to a HARQ-ACK codebook or multiplexed onto a periodic CSI report) may include an indication (e.g., a single bit indication) of the second stage UCI. In some aspects, the first stage UCI may request a resource grant, activate a predetermined resource grant, and/or the like. Based at least in part on receiving a resource grant and/or activating a resource grant, the UE may transmit the second stage UCI, which may include information associated with the request for the radio link adaptation operation.

In some aspects, the UE may transmit the request via a 2-stage request that includes a random access channel (RACH) communication. For example, a first stage of the request may include a RACH preamble that activates a PUSCH, a PUCCH, and/or the like for transmitting a second stage of the request. The second stage of the request may include information associated with the request for the radio link adaptation operation. In some aspects, the UE may transmit the second stage of the request in a resource of the PUSCH, the PUCCH, and/or the like based at least in part on a location of the RACH preamble. For example, the RACH preamble may indicate (e.g., explicitly or implicitly) a resource location of the second stage of the request.

In some aspects, the UE may transmit the request via a 2-stage request including a contention-free resource and a contention-based resource. For example, the UE may transmit a first stage of the request in a contention-free resource (e.g., a resource scheduled for the UE by the base station), and the UE may transmit the second stage of the request in a contention-based resource that may be shared by multiple UEs. In some aspects, a location of a resource associated with the second stage of the request may be based at least in part on a location of the first stage of the request. In some aspects, the base station may, based at least in part on failing to receive the second stage of the request via the contention-based resource, schedule a contention-free resource for the UE to retransmit the second stage of the request.

In some aspects, the UE may be configured with a prohibit timer to reduce repetitive transmissions of requests for radio link adaptation operations. In some aspects, the UE may initiate the prohibit timer based at least in part on transmitting the request. The prohibit timer may indicate that the UE is prohibited from transmitting an additional request for an additional radio link adaptation operation until completion of a threshold amount of time (e.g., when the timer expires, when the timer reaches the threshold amount of time, and/or the like).

In some aspects, the request for the radio link adaptation operation may indicate one or more metrics to update. For example, the request may indicate that an MCS, a repetition number, a beam direction, and/or the like is to be updated. In some aspects, based at least in part on the UE transmitting the request for the radio link adaptation request, the UE and the base station may communicate in a transition operation mode using one or more default (e.g., preconfigured) parameters until the radio link adaptation operation is completed. For example, the base station and the UE may communicate with a default MCS, a default repetition number (e.g., with a current MCS), a default set of beams, and/or the like. In some aspects, the repetition number may indicate a number of repetitions in a time domain and/or a space domain.

In some aspects, the request for the radio link adaptation operation may indicate an urgency of the request. For example, the UE may transmit the request based at least in part on satisfaction of the link quality change threshold (e.g., associated with an RSRP, an SINR, or a pathloss) and levels of urgency may be based at least in part on one or more additional link quality change thresholds. An indication of the urgency of the request may be explicit (e.g., level 1, level 2, level 3 urgency) or implicit (e.g., based at least in part on a link quality metric). For example, the request may implicitly indicate urgency based at least in part on a reported SINR (e.g., with urgency based at least in part on one or more urgency thresholds (e.g., an SINR below 5 dB, equal to about −20 dB, and/or the like)).

In some aspects, the request for the radio link adaptation operation may indicate a recommendation for beams (e.g., base station beams) to consider using for communications with the UE. For example, the request may indicate that a first beam associated with a first beam ID should be a first beam considered for use by the base station, a second beam associated with a second beam ID should be a last beam considered for use by the base station, and/or the like.

As shown by reference number 435, the base station may configure one or more reference signals for transmission to the UE. In some aspects, the base station may configure the one or more reference signals for transmission via one or more beams indicated (e.g., requested) by the UE. In some aspects, the one or more reference signals may include one or more of CSI-RSs, SSBs, pathloss reference signals, and/or the like.

As shown by reference number 440, the UE may receive, and the base station may transmit, one or more reference signals. In some aspects, the base station may transmit the one or more reference signals using repetition. In some aspects, the base station may select a repetition number based at least in part on a requested repetition number for the one or more reference signals. In some aspects, the one or more reference signals may include one or more CSI-RSs, SIBS, and/or the like.

As shown by reference number 445, the UE may generate a CSI report based at least in part on the one or more reference signals. For example, the UE may measure the one or more reference signals, determine one or more link quality metrics (e.g., RSRP, SINR, pathloss, and/or the like), determine one or more radio link parameters to request, and/or the like. For example, the UE may determine a recommended MCS for the base station to use for subsequent transmissions.

As shown by reference number 450, the UE may transmit, and the base station may receive, the CSI report having one or more CSI metrics based at least in part on the one or more reference signals. For example, the UE may report one or more link quality metrics, a recommended beam for downlink transmissions, a recommended MCS for downlink transmissions, and/or the like.

As shown by reference number 455, the base station may update one or more base station beams. For example, the base station may update a transmit beam, a receive beam, and/or the like.

Based at least in part on the UE transmitting the request for the radio link adaptation operation, the base station may update one or more base station beams (e.g., based at least in part on one or more CSI metrics, an indication from the UE, and/or the like). This may facilitate beam synchronization between the base station and UE, receipt of current CSI metrics, and the base station determining proper transmission parameters for downlink communications, which may conserve communication, network, and/or power resources.

As indicated above, FIG. 4 is provided as an example. Other examples may differ from what is described with respect to FIG. 4.

Figure 5:
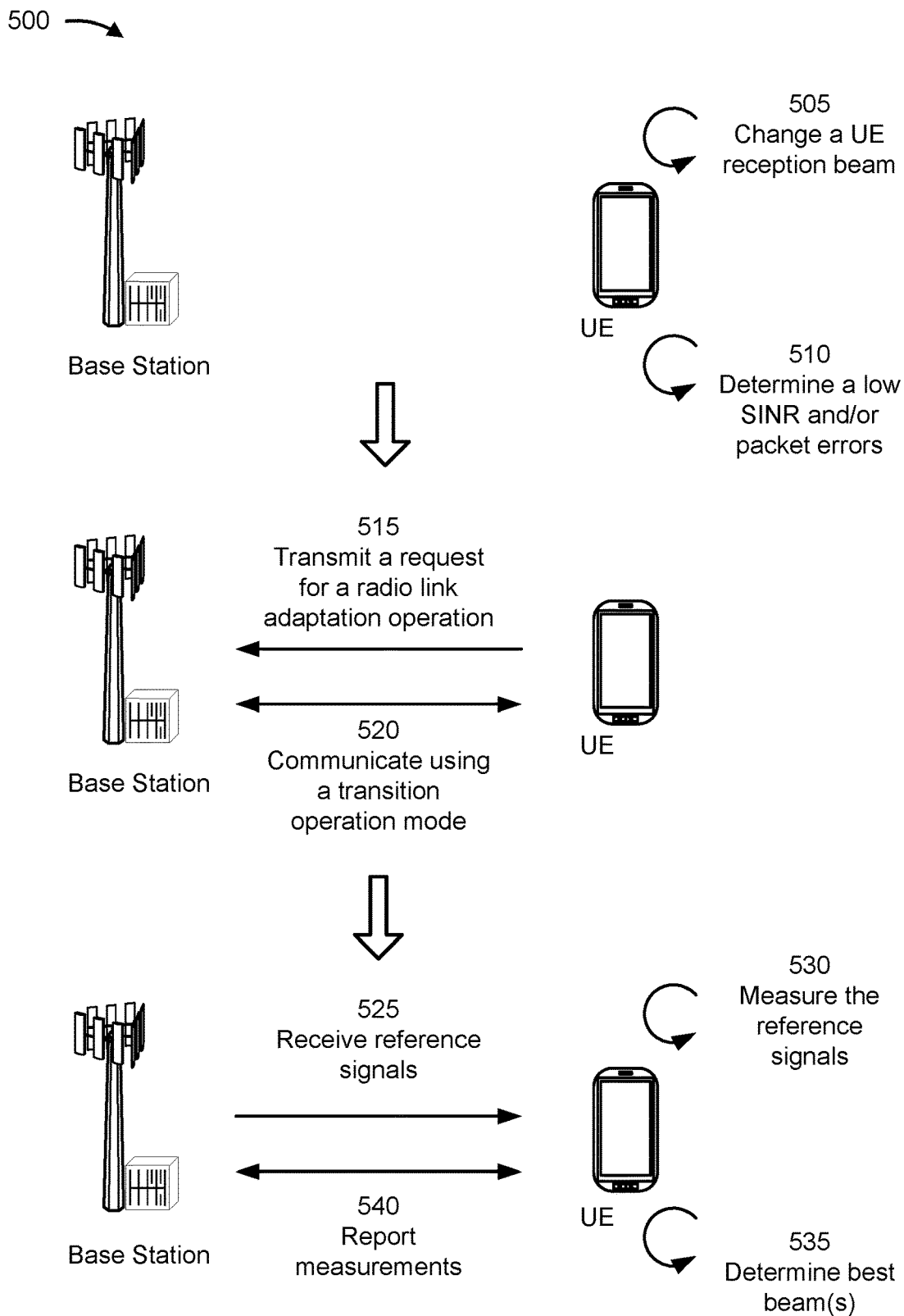

FIG. 5 is a diagram illustrating an example 500 associated with UE requested radio link adaptation operations, in accordance with the present disclosure. As shown in FIG. 5, a base station (e.g., base station 110) may communicate with a UE (e.g., UE 120). The base station and the UE may be part of a wireless network (e.g., wireless network 100). In some aspects, the UE and the base station may be configured to communicate using millimeter wave signals, beamforming, and/or the like.

As shown by reference number 505, the UE may change a UE reception beam. For example, the UE may update one or more parameters of the UE beam, may update to a new UE beam, and/or the like. In some aspects, the UE may select the new UE beam based at least in part on measuring a PDCCH, a PDSCH, one or more reference signals, and/or the like using one or more candidate beams (e.g., using one or more panels of the UE).

As shown by reference number 510, the UE may determine a low SINR and/or packet errors. In some aspects, the UE may determine the low SINR based at least in part on measuring a signal (e.g., a reference signal, a DMRS, a data signal, and/or the like). The UE may determine that an SINR of the signal is low based at least in part on the SINR satisfies a threshold, that a drop in SINR between the signal and a previously reported SINR satisfies a threshold, and/or the like. In some aspects, the UE may determine, based at least in part on the low SINR and/or the packet errors, that a radio link between the UE and the base station should be adapted. For example, the UE may determine that a beam management procedure should be performed to improve the SINR and/or reduce the packet errors.

As shown by reference number 515, the UE may transmit a request for a radio link adaptation operation. The UE may transmit an indication of the request for the radio adaptation operation, an indication of the change of the UE reception beam, information for the base station to use to select a CSI-RS configuration, and/or the like. For example, the UE may transmit the request for the radio link adaptation operation using one or more operations described herein (e.g., with reference to reference number 430).

As shown by reference number 520, the UE and the base station may communicate using a transition operation mode. In some aspects, one or more parameters for communicating during the transition operation mode may be configured by the base station (e.g., before the UE transmits the request or after the UE transmits the request), determined from a communication standard known to the UE and the base station, indicated in the request, and/or the like. In some aspects, the one or more parameters may include an MCS value (e.g., a relatively low MCS value), a repetition value (e.g., a number of repetitions in time, frequency, and/or space), and/or the like.

As shown by reference number 525, the UE may receive reference signals. In some aspects, the UE may receive an indication of a CSI-RS configuration (e.g., identifying one or more parameters of the reference signals) before receiving the one or more reference signals.

As shown by reference number 530, the UE may measure the reference signals using one or more beams. For example, the UE may determine an SINR of the reference signals when received via the one or more beams.

As shown by reference number 535, the UE may determine one or more best beams. For example, the UE may determine one or more beams through which the UE receives the reference signals with a highest SINR. In some aspects, the UE may determine a CSI report, one or more CQIs associated with the one or more best beams, and/or the like.

As shown by reference number 540, the UE may report measurements of the reference signals to the base station. In some aspects, the UE may report the measurements based at least in part on identifying the one or more best beams, indicating SINRs of the one or more best beams, indicating CQIs of the one or more best beams, indicating beam IDs associated with the one or more best beams, identifying reference signal IDs associated with the one or more best beams, and/or the like.

As indicated above, FIG. 5 is provided as an example. Other examples may differ from what is described with respect to FIG. 5.

Figure 6:
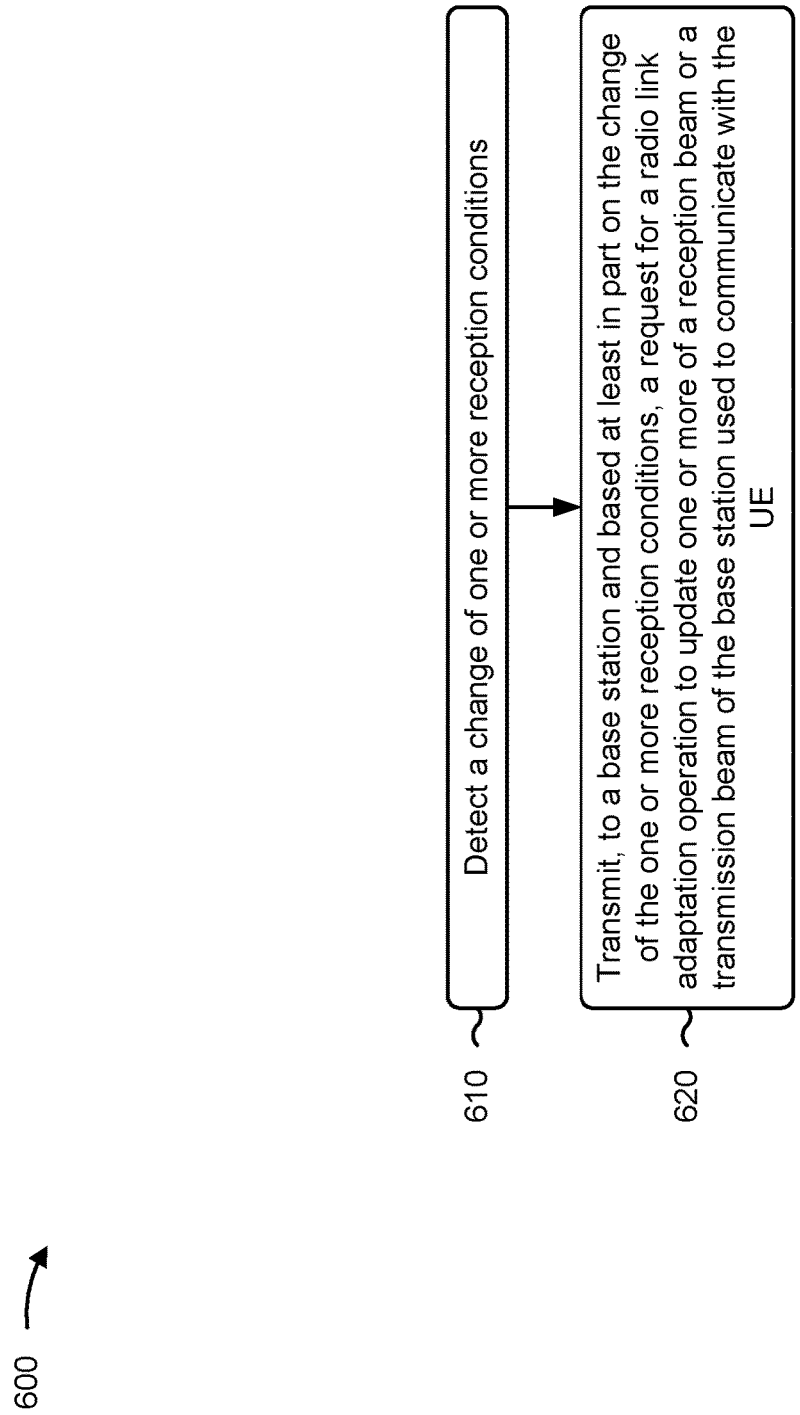
FIG. 6 is a diagram illustrating an example process associated with UE requested radio link adaptation operations, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with UE requested radio link adaptation operations.

As shown in FIG. 6, in some aspects, process 600 may include determining a change of one or more reception conditions (block 610). For example, the UE (e.g., using receive processor 258, transmit processor 264, controller/processor 280, memory 282, and/or the like) may determine a change of one or more reception conditions, as described above.

As further shown in FIG. 6, in some aspects, process 600 may include transmitting, to a base station, a request for a radio link adaptation operation to update one or more of a reception beam or a transmission beam of the base station used to communicate with the UE (block 620). For example, the UE (e.g., using transmit processor 264, controller/processor 280, memory 282, and/or the like) may transmit, to a base station, a request for a radio link adaptation operation to update one or more of a reception beam or a transmission beam of the base station used to communicate with the UE, as described above.

Process 600 may include additional aspects, such as any single aspect or any combination of aspects described below and/or in connection with one or more other processes described elsewhere herein.

In a first aspect, the change of the one or more reception conditions includes one or more of: an update of a reception beam of the UE, an update of a transmission beam of the UE, movement of the UE that satisfies a movement threshold, rotation of the UE that satisfies a rotation threshold, a change in one or more of an RSRP, an SINR, or a pathloss that satisfies a link quality change threshold, a change in speed of the UE that satisfies an acceleration threshold, a reflector change that satisfies a reflector change threshold, or a scatter change that satisfies a scatter change threshold.

In a second aspect, alone or in combination with the first aspect, determining the change of the one or more reception conditions includes determining the change of the one or more reception conditions based at least in part on one or more of: a measurement of one or more demodulation reference signals associated with one or more beams received by one or more antenna panels of the UE, a measurement of a CSI reference signal using repetition and without a CSI report occasion before transmitting the request for the radio link adaptation operation, movement of the UE that satisfies a movement threshold, rotation of the UE that satisfies a rotation threshold, a change in one or more of an RSRP, an SINR, or a pathloss that satisfies a link quality change threshold, a change in speed that satisfies an acceleration threshold, a reflector change that satisfies a reflector change threshold, or a scatter change that satisfies a scatter change threshold.

In a third aspect, alone or in combination with one or more of the first and second aspects, the request for the radio link adaptation operation indicates a request to: measure one or more CSI metrics, report one or more CSI metrics, report a beam identification of a reception beam or a transmission beam of the UE, report a reference signal identification to indicate a QCL source of a TCI state, report a reference signal identification to indicate a spatial reference signal for spatial relation information, or some combination thereof.

In a fourth aspect, alone or in combination with one or more of the first through third aspects, the request for the radio link adaptation operation indicates one or more of: a request for beam refinement via transmission of CSI reference signals using repetition, a number of repetitions to be applied to CSI reference signals, a requested transition operation mode to use for communications with the UE, an urgency of the request for the radio link adaptation operation.

In a fifth aspect, alone or in combination with one or more of the first through fourth aspects, process 600 includes one or more of: receiving, based at least in part on the request for the radio link adaptation operation, one or more reference signals; or reporting one or more CSI metrics based at least in part on one or more reference signals.

In a sixth aspect, alone or in combination with one or more of the first through fifth aspects, the one or more reference signals are associated with one or more QCL source reference signals that are based at least in part on a beam identification or a reference signal identification indicated in the request for the radio link adaptation operation.

In a seventh aspect, alone or in combination with one or more of the first through sixth aspects, transmitting the request for the radio link adaptation operation includes transmitting the request for the radio link adaptation operation using one or more MAC CEs via one or more of: an uplink grant received before generation of the request for the radio link adaptation operation, a new uplink grant requested via a scheduling request transmitted based at least in part on generation of the request for the radio link adaptation operation, a new uplink grant requested via one or more new UCI bits transmitted with another type of UCI, or a predetermined grant activated by the UE via one or more new UCI bits.

In an eighth aspect, alone or in combination with one or more of the first through seventh aspects, process 600 includes one or more of: transmitting a request for the new uplink grant via one or more new UCI bits transmitted with HARQ feedback; or activating the predetermined grant via one or more new UCI bits transmitted with HARQ feedback.

In a ninth aspect, alone or in combination with one or more of the first through eighth aspects, transmitting the request for the radio link adaptation operation includes transmitting the request for the radio link adaptation operation using UCI via one or more of: a PUCCH, a PUSCH, multiplexing the request for the radio link adaptation with additional UCI, or 2-stage UCI.

In a tenth aspect, alone or in combination with one or more of the first through ninth aspects, transmitting the request for the radio link adaptation operation includes one or more of: transmitting the request for the radio link adaptation operation via a first stage and a second state, wherein the first stage includes a RACH communication that indicates a resource location of the second stage; or multiplexing the request for the radio link adaptation operation with a periodic CSI report.

In an eleventh aspect, alone or in combination with one or more of the first through tenth aspects, process 600 includes initiating, based at least in part on transmitting the request for the radio link adaptation operation, a prohibit timer, wherein the prohibit timer indicates that the UE is prohibited from transmitting an additional request for an additional radio link adaptation operation until completion of a threshold amount of time.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: detecting a change of one or more reception conditions; and transmitting, to a base station and based at least in part on the change of the one or more reception conditions, a request for a radio link adaptation operation to update one or more of a reception beam or a transmission beam of the base station used to communicate with the UE.

Aspect 2: The method of Aspect 1, wherein the change of the one or more reception conditions comprises one or more of: an update of a reception beam of the UE, an update of a transmission beam of the UE, movement of the UE that satisfies a movement threshold, rotation of the UE that satisfies a rotation threshold, a change in one or more of a reference signal received power, a signal to interference plus noise ratio, or a pathloss that satisfies a link quality change threshold, a change in speed of the UE that satisfies an acceleration threshold, a reflector change that satisfies a reflector change threshold, or a scatter change that satisfies a scatter change threshold.

Aspect 3: The method of any of Aspects 1-2, wherein detecting the change of the one or more reception conditions comprises: detecting the change of the one or more reception conditions based at least in part on one or more of: a measurement of one or more demodulation reference signals associated with one or more beams received by one or more antenna panels of the UE, a measurement of a channel state information (CSI) reference signal using repetition and without a CSI report occasion before transmitting the request for the radio link adaptation operation, movement of the UE that satisfies a movement threshold, rotation of the UE that satisfies a rotation threshold, a change in one or more of a reference signal received power, a signal to interference plus noise ratio, or a pathloss that satisfies a link quality change threshold, a change in speed that satisfies an acceleration threshold, a reflector change that satisfies a reflector change threshold, or a scatter change that satisfies a scatter change threshold.

Aspect 4: The method of any of Aspects 1-3, wherein the request for the radio link adaptation operation indicates a request to: measure one or more channel state information (CSI) metrics, report one or more CSI metrics, report a beam identification of a reception beam or a transmission beam of the UE, report a reference signal identification to indicate a quasi-co-location source of a transmission configuration indicator state, report a reference signal identification to indicate a spatial reference signal for spatial relation information, or some combination thereof.

Aspect 5: The method of any of Aspects 1-4, wherein the request for the radio link adaptation operation indicates one or more of: a request for beam refinement via transmission of channel state information (CSI) reference signals using repetition, a number of repetitions to be applied to CSI reference signals, a requested transition operation mode to use for communications with the UE, or an urgency of the request for the radio link adaptation operation.

Aspect 6: The method of any of Aspects 1-5, further comprising one or more of: receiving, based at least in part on the request for the radio link adaptation operation, one or more reference signals; or reporting one or more channel state information metrics based at least in part on one or more reference signals.

Aspect 7: The method of Aspect 6, wherein the one or more reference signals are associated with one or more quasi-co-location source reference signals that are based at least in part on a beam identification or a reference signal identification indicated in the request for the radio link adaptation operation.

Aspect 8: The method of any of Aspects 1-7, wherein transmitting the request for the radio link adaptation operation comprises: transmitting the request for the radio link adaptation operation using one or more medium access control control elements via one or more of: an uplink grant received before generation of the request for the radio link adaptation operation, a new uplink grant requested via a scheduling request transmitted based at least in part on generation of the request for the radio link adaptation operation, a new uplink grant requested via one or more new uplink control information bits transmitted with another type of uplink control information, or a predetermined grant activated by the UE via one or more new uplink control information bits.

Aspect 9: The method of Aspect 8, further comprising one or more of: transmitting a request for the new uplink grant via one or more new uplink control information bits transmitted with hybrid automatic repeat request (HARQ) feedback; or activating the predetermined grant via one or more new uplink control information bits transmitted with HARQ feedback.

Aspect 10: The method of any of Aspects 1-9, wherein transmitting the request for the radio link adaptation operation comprises: transmitting the request for the radio link adaptation operation using uplink control information via one or more of: a physical uplink control channel, a physical uplink shared channel, multiplexing the request for the radio link adaptation with additional uplink control information, or 2-stage uplink control information.

Aspect 11: The method of any of Aspects 1-10, wherein transmitting the request for the radio link adaptation operation comprises one or more of: transmitting the request for the radio link adaptation operation via a first stage and a second state, wherein the first stage includes a random access channel communication that indicates a resource location of the second stage; or multiplexing the request for the radio link adaptation operation with a periodic channel state information report.

Aspect 12: The method of any of Aspects 1-11, further comprising: initiating, based at least in part on transmitting the request for the radio link adaptation operation, a prohibit timer, wherein the prohibit timer indicates that the UE is prohibited from transmitting an additional request for an additional radio link adaptation operation until completion of a threshold amount of time.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and one or more processors operatively coupled to the memory, the memory and the one or more processors configured to:
detect a change of one or more reception conditions; and
transmit, to a base station and based at least in part on the change of the one or more reception conditions, a request for a radio link adaptation operation to update one or more of a reception beam or a transmission beam of the base station used to communicate with the UE, wherein transmission of the request for the radio link adaptation operation comprises transmission of the request using one or more medium access control control elements via one or more of:
an uplink grant received before generation of the request for the radio link adaptation operation,
a new uplink grant requested via a scheduling request transmitted based at least in part on generation of the request for the radio link adaptation operation,
a new uplink grant requested via one or more new uplink control information bits transmitted with another type of uplink control information, or
a predetermined grant activated by the UE via one or more new uplink control information bits.

2. The UE of claim 1, wherein the change of one or more reception conditions comprises one or more of:
an update of a reception beam of the UE,
an update of a transmission beam of the UE,
movement of the UE that satisfies a movement threshold,
rotation of the UE that satisfies a rotation threshold,
a change in one or more of a reference signal received power, a signal to interference plus noise ratio, or a pathloss that satisfies a link quality change threshold,
a change in speed of the UE that satisfies an acceleration threshold,
a reflector change that satisfies a reflector change threshold, or
a scatter change that satisfies a scatter change threshold.

3. The UE of claim 1, wherein the one or more processors are further configured to:
detect the change of the one or more reception conditions based at least in part on one or more of:
a measurement of one or more demodulation reference signals associated with one or more beams received by one or more antenna panels of the UE,
a measurement of a channel state information (CSI) reference signal using repetition and without a CSI report occasion before transmitting the request for the radio link adaptation operation,
movement of the UE that satisfies a movement threshold,
rotation of the UE that satisfies a rotation threshold,
a change in one or more of a reference signal received power, a signal to interference plus noise ratio, or a pathloss that satisfies a link quality change threshold,
a change in speed that satisfies an acceleration threshold,
a reflector change that satisfies a reflector change threshold, or
a scatter change that satisfies a scatter change threshold.

4. The UE of claim 1, wherein the request for the radio link adaptation operation indicates a request to:
measure one or more channel state information (CSI) metrics,
report the one or more CSI metrics,
report a beam identification of a reception beam or a transmission beam of the UE,
report a reference signal identification to indicate a quasi-co-location source of a transmission configuration indicator state,
report the reference signal identification to indicate a spatial reference signal for spatial relation information, or
some combination thereof.

5. The UE of claim 1, wherein the request for the radio link adaptation operation indicates one or more of:
a request for beam refinement via transmission of channel state information (CSI) reference signals using repetition,
a number of repetitions to be applied to the CSI reference signals,
a requested transition operation mode to use for communications with the UE, or
an urgency of the request for the radio link adaptation operation.

6. The UE of claim 1, wherein the one or more processors are further configured to:
receive, based at least in part on the request for the radio link adaptation operation, one or more reference signals; or
report one or more channel state information metrics based at least in part on the one or more reference signals; or
some combination thereof.

7. The UE of claim 6, wherein the one or more reference signals are associated with one or more quasi-co-location source reference signals that are based at least in part on a beam identification or a reference signal identification indicated in the request for the radio link adaptation operation.

8. The UE of claim 1, wherein the one or more processors are further configured to:
transmit a request for the new uplink grant via one or more new uplink control information bits transmitted with hybrid automatic repeat request (HARQ) feedback;
activate the predetermined grant via one or more new uplink control information bits transmitted with the HARQ feedback; or
some combination thereof.

9. The UE of claim 1, wherein transmission of the request for the radio link adaptation operation comprises:
transmission of the request for the radio link adaptation operation using uplink control information via one or more of:
a physical uplink control channel,
a physical uplink shared channel,
multiplexing the request for the radio link adaptation with additional uplink control information, or
2-stage uplink control information.

10. The UE of claim 1, wherein transmission of the request for the radio link adaptation operation comprises one or more of:
transmission of the request for the radio link adaptation operation via a first stage and a second state,
wherein the first stage includes a random access channel communication that indicates a resource location of the second stage; or
multiplexing of the request for the radio link adaptation operation with a periodic channel state information report.

11. The UE of claim 1, wherein the one or more processors are further configured to:
initiate, based at least in part on transmission of the request for the radio link adaptation operation, a prohibit timer,
wherein the prohibit timer indicates that the UE is prohibited from transmitting an additional request for an additional radio link adaptation operation until completion of a threshold amount of time.

12. A method of wireless communication performed by a user equipment (UE), comprising:
  detecting a change of one or more reception conditions; and
  transmitting, to a base station and based at least in part on the change of the one or more reception conditions, a request for a radio link adaptation operation to update one or more of a reception beam or a transmission beam of the base station used to communicate with the UE, wherein transmitting the request for the radio link adaptation operation comprises transmitting the request using one or more medium access control control elements via one or more of:
  an uplink grant received before generation of the request for the radio link adaptation operation,
  a new uplink grant requested via a scheduling request transmitted based at least in part on generation of the request for the radio link adaptation operation,
  a new uplink grant requested via one or more new uplink control information bits transmitted with another type of uplink control information, or
  a predetermined grant activated by the UE via one or more new uplink control information bits.

13. The method of claim 12, wherein the change of the one or more reception conditions comprises one or more of:
  an update of a reception beam of the UE,
  an update of a transmission beam of the UE,
  movement of the UE that satisfies a movement threshold,
  rotation of the UE that satisfies a rotation threshold,
  a change in one or more of a reference signal received power, a signal to interference plus noise ratio, or a pathloss that satisfies a link quality change threshold,
  a change in speed of the UE that satisfies an acceleration threshold,
  a reflector change that satisfies a reflector change threshold, or
  a scatter change that satisfies a scatter change threshold.

14. The method of claim 12, wherein detecting the change of the one or more reception conditions comprises:
  detecting the change of the one or more reception conditions based at least in part on one or more of:
  a measurement of one or more demodulation reference signals associated with one or more beams received by one or more antenna panels of the UE,
  a measurement of a channel state information (CSI) reference signal using repetition and without a CSI report occasion before transmitting the request for the radio link adaptation operation,
  movement of the UE that satisfies a movement threshold,
  rotation of the UE that satisfies a rotation threshold,
  a change in one or more of a reference signal received power, a signal to interference plus noise ratio, or a pathloss that satisfies a link quality change threshold,
  a change in speed that satisfies an acceleration threshold,
  a reflector change that satisfies a reflector change threshold, or
  a scatter change that satisfies a scatter change threshold.

15. The method of claim 12, wherein the request for the radio link adaptation operation indicates a request to:
  measure one or more channel state information (CSI) metrics,
  report the one or more CSI metrics,
  report a beam identification of a reception beam or a transmission beam of the UE,
  report a reference signal identification to indicate a quasi-co-location source of a transmission configuration indicator state,
  report the reference signal identification to indicate a spatial reference signal for spatial relation information, or
  some combination thereof.

16. The method of claim 12, wherein the request for the radio link adaptation operation indicates one or more of:
  a request for beam refinement via transmission of channel state information (CSI) reference signals using repetition,
  a number of repetitions to be applied to the CSI reference signals,
  a requested transition operation mode to use for communications with the UE, or
  an urgency of the request for the radio link adaptation operation.

17. The method of claim 12, further comprising one or more of:
  receiving, based at least in part on the request for the radio link adaptation operation, one or more reference signals; or
  reporting one or more channel state information metrics based at least in part on the one or more reference signals.

18. The method of claim 17, wherein the one or more reference signals are associated with one or more quasi-co-location source reference signals that are based at least in part on a beam identification or a reference signal identification indicated in the request for the radio link adaptation operation.

19. The method of claim 12, further comprising one or more of:
  transmitting a request for the new uplink grant via one or more new uplink control information bits transmitted with hybrid automatic repeat request (HARQ) feedback; or
  activating the predetermined grant via one or more new uplink control information bits transmitted with the HARQ feedback.

20. The method of claim 12, wherein transmitting the request for the radio link adaptation operation comprises:
  transmitting the request for the radio link adaptation operation using uplink control information via one or more of:
  a physical uplink control channel,
  a physical uplink shared channel,
  multiplexing the request for the radio link adaptation with additional uplink control information, or
  2-stage uplink control information.

21. The method of claim 12, wherein transmitting the request for the radio link adaptation operation comprises one or more of:
  transmitting the request for the radio link adaptation operation via a first stage and a second state,
  wherein the first stage includes a random access channel communication that indicates a resource location of the second stage; or
  multiplexing the request for the radio link adaptation operation with a periodic channel state information report.

22. The method of claim 12, further comprising:
  initiating, based at least in part on transmitting the request for the radio link adaptation operation, a prohibit timer,
  wherein the prohibit timer indicates that the UE is prohibited from transmitting an additional request for an additional radio link adaptation operation until completion of a threshold amount of time.

23. A non-transitory computer-readable medium storing one or more instructions for wireless communication, the one or more instructions comprising:
one or more instructions that, when executed by one or more processors of a user equipment (UE), cause the one or more processors to:
detect a change of one or more reception conditions; and
transmit, to a base station and based at least in part on the change of the one or more reception conditions, a request for a radio link adaptation operation to update one or more of a reception beam or a transmission beam of the base station used to communicate with the UE, wherein transmission of the request for the radio link adaptation operation comprises transmission of the request using one or more medium access control control elements via one or more of:
an uplink grant received before generation of the request for the radio link adaptation operation,
a new uplink grant requested via a scheduling request transmitted based at least in part on generation of the request for the radio link adaptation operation,
a new uplink grant requested via one or more new uplink control information bits transmitted with another type of uplink control information, or
a predetermined grant activated by the UE via one or more new uplink control information bits.

24. The non-transitory computer-readable medium of claim 23, wherein the one or more instructions, when executed by the one or more processors, further cause the one or more processors to:
detect the change of the one or more reception conditions based at least in part on one or more of:
a measurement of one or more demodulation reference signals associated with one or more beams received by one or more antenna panels of the UE,
a measurement of a channel state information (CSI) reference signal using repetition and without a CSI report occasion before transmitting the request for the radio link adaptation operation,
movement of the UE that satisfies a movement threshold,
rotation of the UE that satisfies a rotation threshold,
a change in one or more of a reference signal received power, a signal to interference plus noise ratio, or a pathloss that satisfies a link quality change threshold,
a change in speed that satisfies an acceleration threshold,
a reflector change that satisfies a reflector change threshold, or
a scatter change that satisfies a scatter change threshold.

25. An apparatus for wireless communication, comprising:
means for detecting a change of one or more reception conditions; and
means for transmitting, to a base station and based at least in part on the change of the one or more reception conditions, a request for a radio link adaptation operation to update one or more of a reception beam or a transmission beam of the base station used to communicate with the apparatus, wherein transmission of the request for the radio link adaptation operation comprises transmission of the request using one or more medium access control control elements via one or more of:
an uplink grant received before generation of the request for the radio link adaptation operation,
a new uplink grant requested via a scheduling request transmitted based at least in part on generation of the request for the radio link adaptation operation,
a new uplink grant requested via one or more new uplink control information bits transmitted with another type of uplink control information, or
a predetermined grant activated by the UE via one or more new uplink control information bits.

26. The apparatus of claim 25, wherein the change of one or more reception conditions comprises one or more of:
an update of a reception beam of the apparatus,
an update of a transmission beam of the apparatus,
movement of the apparatus that satisfies a movement threshold,
rotation of the apparatus that satisfies a rotation threshold,
a change in one or more of a reference signal received power, a signal to interference plus noise ratio, or a pathloss that satisfies a link quality change threshold,
a change in speed of the apparatus that satisfies an acceleration threshold,
a reflector change that satisfies a reflector change threshold, or
a scatter change that satisfies a scatter change threshold.

27. The apparatus of claim 25, wherein the request for the radio link adaptation operation indicates a request to:
measure one or more channel state information (CSI) metrics,
report the one or more CSI metrics,
report a beam identification of a reception beam or a transmission beam of the apparatus,
report a reference signal identification to indicate a quasi-co-location source of a transmission configuration indicator state,
report the reference signal identification to indicate a spatial reference signal for spatial relation information, or
some combination thereof.

* * * * *